(12) United States Patent
Devitt et al.

(10) Patent No.: US 6,947,976 B1
(45) Date of Patent: Sep. 20, 2005

(54) SYSTEM AND METHOD FOR PROVIDING LOCATION-BASED AND TIME-BASED INFORMATION TO A USER OF A HANDHELD DEVICE

(75) Inventors: Jason Anthony Devitt, New York, NY (US); David Stcey Joerg, New York, NY (US); Jon McAuliffe, Seattle, WA (US)

(73) Assignee: Vindigo, Inc., New York, NY (US)

( * ) Notice: Subject to any disclaimer, the term of this patent is extended or adjusted under 35 U.S.C. 154(b) by 823 days.

(21) Appl. No.: 09/629,568

(22) Filed: Jul. 31, 2000

(51) Int. Cl.[7] .................... G06F 15/16; G06F 15/173; H04Q 7/20
(52) U.S. Cl. .................... 709/219; 709/238; 455/456.1
(58) Field of Search .................... 455/414.2, 414.3, 455/456.1, 404.2, 415; 709/219, 238, 250

(56) References Cited

U.S. PATENT DOCUMENTS

| | | |
|---|---|---|
| 4,954,958 A | 9/1990 | Savage et al. |
| 5,727,202 A | 3/1998 | Kucala |
| 5,809,242 A | 9/1998 | Shaw et al. |
| 5,848,396 A | 12/1998 | Gerace |
| 5,933,811 A | 8/1999 | Angles et al. |
| 5,944,769 A | 8/1999 | Musk et al. |
| 5,946,687 A | 8/1999 | Gehani et al. |
| 5,948,040 A * | 9/1999 | DeLorme et al. ............ 701/201 |
| 5,974,238 A * | 10/1999 | Chase, Jr. .................... 709/248 |
| 6,009,403 A | 12/1999 | Sato |
| 6,115,754 A * | 9/2000 | Landgren ..................... 709/249 |
| 6,134,548 A * | 10/2000 | Gottsman et al. .............. 707/5 |
| 6,148,219 A * | 11/2000 | Engelbrecht et al. .... 455/456.2 |
| 6,480,785 B1 * | 11/2002 | Joerg et al. .................. 701/209 |
| 6,597,906 B1 * | 7/2003 | Van Leeuwen et al. ..... 455/436 |
| 6,671,737 B1 * | 12/2003 | Snowdon et al. ........... 709/243 |
| 6,678,613 B2 * | 1/2004 | Andrews et al. ............ 701/213 |

\* cited by examiner

*Primary Examiner*—Larry D. Donaghue
(74) *Attorney, Agent, or Firm*—Morrison & Foerster LLP

(57) ABSTRACT

A system for providing to a user of a handheld device at least one of location-based information and time-based information includes a server assembly including (1) a server application and a server data storage medium; (2) activity site information periodically updated in the server data storage medium and pertaining to at least one activity site, the activity site information being correspondingly updated in a device data storage medium of the handheld device using a communication link between the handheld device and the server assembly; and (3) a client application on the handheld device adapted to (a) obtain reference location information identifying a reference location; (b) access the activity site information from the device data storage medium; (c) determine a relationship between the activity site information and the reference location, the relationship being at least one of a geographic relationship and a temporal relationship; (d) select at least a portion of the activity site information based on the relationship; and (e) present the portion to the user with reference to the relationship.

56 Claims, 14 Drawing Sheets

SYSTEM AND METHOD FOR PROVIDING LOCATION-BASED AND TIME-BASED INFORMATION TO A USER OF A HANDHELD DEVICE

This invention relates generally to systems and methods for providing information to users of handheld devices and specifically to systems and methods for providing location-based information and time-based information to users of handheld devices.

BACKGROUND OF THE INVENTION

The popularity of devices that provide mobile access to electronic information, such as handheld computers, pagers and data-enabled cellular telephones, has grown explosively over the past several years. Some of these devices can communicate over wireless network connections with any computer on a public network such as the Internet, while others have no network connectivity per se and instead communicate periodically with a single (possibly networked) machine via a dedicated wire. When using such mobile devices, it is desirable to have available information that can be organized according to the particular time and place in which the user is situated while interacting with the device.

Related patents include the following. U.S. Pat. No. 5,809,242 "ELECTRONIC MAIL SYSTEM FOR DISPLAYING ADVERTISEMENT AT LOCAL COMPUTER RECEIVED FROM REMOTE SYSTEM WHILE THE LOCAL COMPUTER IS OFF-LINE THE REMOTE SYSTEM" discloses a business method for store-and-forward email provision commingled with an advertising system. Claims 35–40 describe a more general digital content delivery system with advertising, and specify a local computer being periodically connected to a network, but otherwise "off-line." This reference does not disclose handheld devices that are either persistently on-line (e.g., via a wireless network connection) or persistently off-line (e.g., have no network connectivity).

U.S. Pat. No. 5,848,396 "METHOD AND APPARATUS FOR DETERMINING BEHAVIORAL PROFILE OF A COMPUTER USER" discloses advertisements distributed over a network. U.S. Pat. No. 5,933,811 "SYSTEM AND METHOD FOR DELIVERING CUSTOMIZED ADVERTISEMENTS WITHIN INTERACTIVE COMMUNICATION SYSTEMS" discloses the dissemination of advertising over a network by a third party intermediating between a content provider and an end user. U.S. Pat. No. 5,937,392 "BANNER ADVERTISING DISPLAY SYSTEM AND METHOD WITH FREQUENCY OF ADVERTISEMENT CONTROL" discloses a campaign-based controlling mechanism. However, none of these references discloses handheld devices or geographical-temporal components.

U.S. Pat. No. 5,727,202 "METHOD AND APPARATUS FOR SYNCHRONIZING INFORMATION ON TWO DIFFERENT COMPUTER SYSTEMS" discloses a process for reconciling the contents of two files. U.S. Pat. No. 5,946,687 "GEO-ENABLED PERSONAL INFORMATION MANAGER" discloses the attachment of geographic information to contact records in a handheld computer database. Neither of these references discloses advertising or the periodic updating of information.

U.S. Pat. No. 5,944,769 "INTERACTIVE NETWORK DIRECTORY SERVICE WITH INTEGRATED MAPS AND DIRECTIONS" and U.S. Pat. No. 4,954,958 "DIRECTIONAL INFORMATION SYSTEM" disclose location searches and direction generation for networked devices. U.S. Pat. No. 6,009,403 "TRAVEL PLAN PREPARING DEVICE" discloses a system for retrieving service facilities of interest in a particular geographic area. None of these references discloses off-line components, advertising components, annotation components or dynamic updating of information.

Related commercial products include the following. CitiKey provides searchable city guides for handheld devices. It does not support the specification of a current location and subsequent reorganization of search results based on that location. Further, it does not provide an automated system and method for dynamic incremental updates of information and client components on a handheld device.

CitySearch™, a Web-based city informational guide, and AvantGo™, a service provider allowing for the automated transmission of Web-based content to handheld devices, together provide a system which allows a user to receive periodically updated recommendation content for individual cities. The system is unable to organize information and present search results according to physical location, and does not support any searching by the user of a handheld device.

InfoSpace™ provides information infrastructure services for handheld devices. It does not support the specification of a current location and the subsequent reorganization of search results based on that location. Lonely Planet™/Concept Kitchen/CitiSync™ provides a system that allows a user to access information about individual cities on handheld devices and is able to display geographic information. It is unable to present search results according to a specific physical locale, although it is able to display geographic information. Aramis Communications' City Guides allow a user to access information about individual cities on handheld devices, but cannot present search results according to a specific physical locale. Zagat™/LandWare provides electronic city guides that categorize profiled destinations by neighborhood but that lack any interface based on the specific physical locale of the user. None of these three systems provides an automated system and method for dynamic incremental updates of information and client components on a handheld device. With the exception of InfoSpace™, none of the systems supports handheld devices with wireless network connectivity.

TrekWare™ provides interactive mapping software for handheld devices, but does not support the specification of a current location and subsequent reorganization of search results based on that location, does not provide an automated system and method for dynamic incremental updates of information and client components on the handheld device, and does not support arbitrary searches by the user.

Webraska Mobile Technologies S.A. provides mobile phone services that allow users to identify their location and receive automobile, subway, and pedestrian directions to nearby locations such as restaurants, hotels, gas stations, parking, post offices, and hospitals. Some services also provide real-time maps showing road conditions on the screen of the mobile phone. However, the system does not provide an automated system and method for dynamic incremental updates of information and client components on a handheld device.

SUMMARY OF THE INVENTION

The invention provides a system for providing to a user of a handheld device at least one of location-based information and time-based information including (1) a server assembly including a server application and a server data storage medium; (2) activity site information periodically updated in the server data storage medium and pertaining to at least one activity site, the activity site information being correspondingly updated in a device data storage medium of the handheld device using a communication link between the handheld device and the server assembly; and (3) a client application on the handheld device. The client application is adapted to (a) obtain reference location information identifying a reference location; (b) access the activity site information from the device data storage medium; (c) determine a relationship between the activity site information and the reference location, the relationship being at least one of a geographic relationship and a temporal relationship; (d) select at least a portion of the activity site information based on the relationship; and (e) present the portion to the user with reference to the relationship.

The invention also provides a system for providing to a user of a handheld device at least one of location-based information and time-based information, including (1) a server assembly including a server data storage medium; (2) activity site information periodically updated in the server data storage medium and pertaining to at least one activity site; (3) a server application on the server assembly adapted to select from a plurality of street identifiers a plurality of first street identifiers, transmit the plurality of first street identifiers to the client application; and (4) a client application on the handheld device. The client application is adapted to (a) provide a first street selection means for the user to select from the plurality of first street identifiers a first street identifier identifying a first street, and (b) transmit the first street identifier to the server application. The server application is further adapted to (a) select from the plurality of street identifiers a plurality of intersecting street identifiers each identifying a street intersecting the first street, and (b) transmit the plurality of intersecting street identifiers to the client application. The client application is further adapted to (a) provide an intersection street selection means for the user to select from the plurality of intersecting street identifiers an intersecting street identifier identifying a street intersecting the first street, and (b) transmit the intersecting street identifier to the server application. The server application is further adapted to (a) use the identifiers to identify a reference location; (b) access the activity site information from the server data storage medium; (c) determine a relationship between the activity site information and the reference location, the relationship being at least one of a geographic relationship and a temporal relationship; (d) select at least a portion of the activity site information based on the relationship; and (e) transmit the portion to the handheld device using the communication link. The client application is further adapted to present the portion to the user with reference to the relationship.

The invention further provides a method for providing to a user of a handheld device at least one of location-based information and time-based information including (1) obtaining reference location information identifying a reference location; (2) accessing activity site information pertaining to at least one activity site; (3) determining a relationship between the activity site information and the reference location, the relationship being at least one of a geographic relationship and a temporal relationship; (4) selecting at least a portion of the activity site information based on the relationship; and (5) presenting the portion to the user with reference to the relationship. In this embodiment, the activity site information is periodically updated in a server data storage medium of a server assembly, and is correspondingly updated in a device data storage medium of the handheld device using a communication link between the handheld device and the server assembly. Further in this embodiment, accessing the activity site information includes accessing the activity site information from the device data storage medium.

The invention further provides a method for providing to a user of a handheld device at least one of location-based information and time-based information, including (1) selecting from a plurality of street identifiers a plurality of first street identifiers; (2) transmitting the plurality of first street identifiers to a client application on the handheld device; (3) receiving a selected first street identifier from the client application; (4) selecting from the plurality of street identifiers a plurality of intersecting street identifiers each identifying a street intersecting the first street; (5) transmitting the plurality of intersecting street identifiers to the client application; (6) receiving a selected intersecting street identifier from the client application; (7) using the selected identifiers to identify a reference location; (8) accessing activity site information pertaining to at least one activity site; (9) determining a relationship between the activity site information and the reference location, the relationship being at least one of a geographic relationship and a temporal relationship; (10) selecting at least a portion of the activity site information based on the relationship; and (11) transmitting the portion to the handheld device for presentation to the user with reference to the relationship. In this embodiment, the activity site information is periodically updated in a server data storage medium of a server assembly and accessing the activity site information includes accessing the activity site information from the server data storage medium. Further in this embodiment, the client application is adapted to (a) provide a first street selection means for the user to select from the plurality of first street identifiers the selected first street identifier identifying a first street; (b) provide an intersecting street selection means for the user to select from the plurality of intersecting street identifiers the selected intersecting street identifier identifying a street intersecting the selected first street; and (c) present the portion to the user with reference to the relationship.

The invention further provides a method for providing to a user of a handheld device at least one of location-based information and time-based information, including (1) receiving reference location information from a client application on the handheld device, the reference location information identifying a reference location; (2) accessing activity site information pertaining to at least one activity site; (3) determining a relationship between the activity site information and the reference location, the relationship being at least one of a geographic relationship and a temporal relationship; (4) selecting at least a portion of the activity site information based on the relationship; and (5) transmitting the portion to a handheld device for presentation to the user with reference to the relationship. In this embodiment, (a) the activity site information is periodically updated in a server data storage medium of a server assembly, (b) accessing the activity site information comprises accessing the activity site information from the server data storage medium, and (c) the client application is adapted to (i) obtain the reference location information and (ii) present the portion to the user with reference to the relationship.

This embodiment includes any one or all of several features. In a first feature, the client application is adapted to (a) obtain a user contribution including at least one of (i) a user annotation including a statement of the user pertaining to the activity site and (ii) a user addition including information pertaining to a user-added activity site. In a second feature, the client application is adapted to update on the handheld device at least a portion of the client application. In a third feature, the client application is adapted to transmit to a second handheld device transfer data including at least a portion of the client application and the second handheld device is adapted to receive the transfer data and store it in a device data storage medium of the second handheld device. In a fourth feature, the method further includes maintaining at least one historical record pertaining to at least one of (a) a request of the client application by the user, (b) a presentation of information by the client application to the user, (c) an interaction between the user and at least one of the client application and the handheld device, (d) an interaction between the client application and at least one of the handheld device and a server assembly, and (e) an interaction between the handheld device and the server assembly.

DETAILED DESCRIPTION OF THE INVENTION

Figure 1:
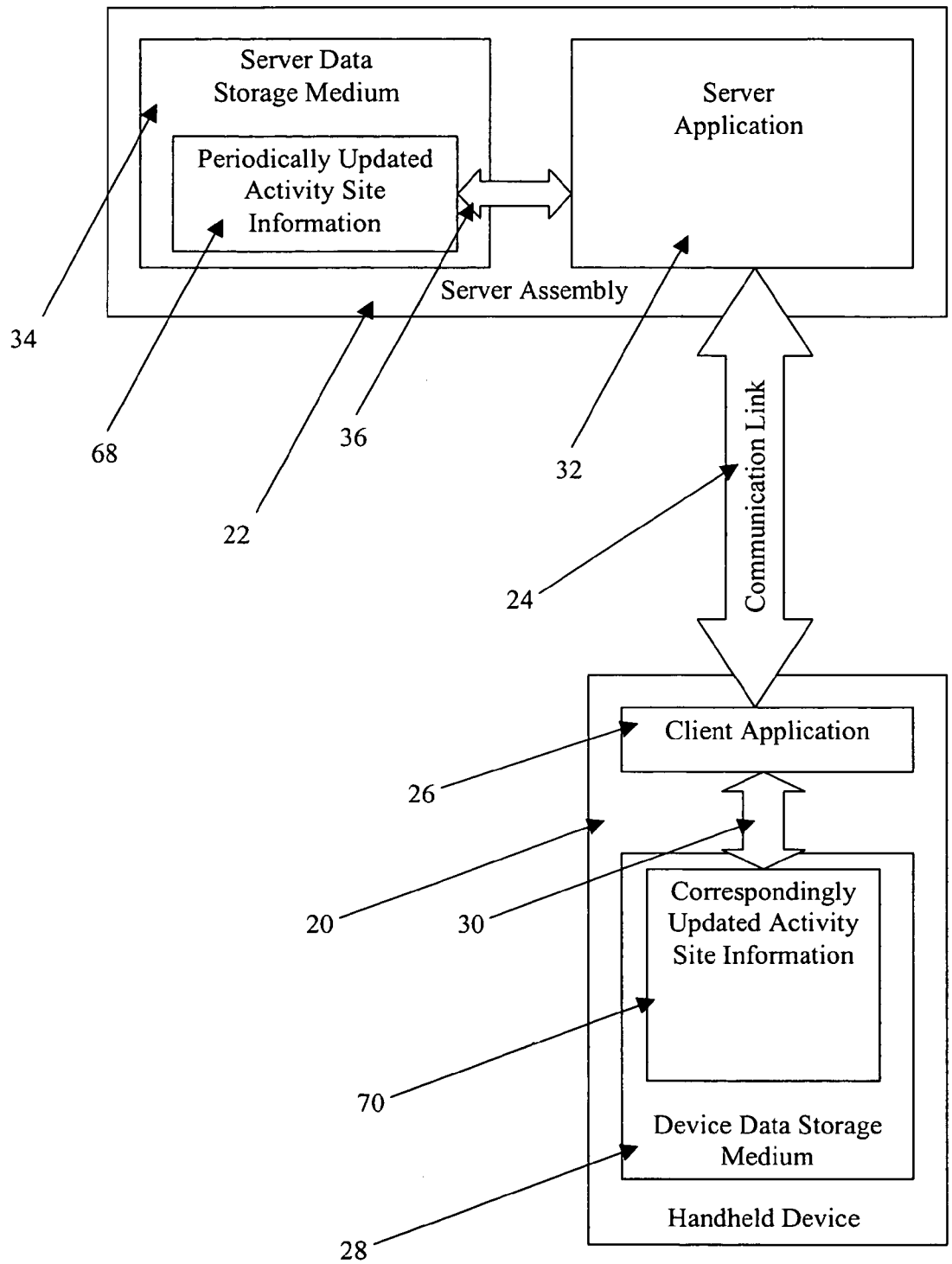
FIG. 1 is a graphic representation of a first embodiment of the invention.

As shown in FIG. 1, a first embodiment of the invention includes a handheld device 20, a server assembly 22, and a communication link 24 between the handheld device 20 and the server assembly 22. The handheld device 20 includes a client application 26 running on the handheld device 20 and a device data storage medium 28 accessible by the client application 26. The handheld device 20 is, for example, a Palm™ of the type manufactured by Palm, Inc. adapted to run the Palm™ operating system ("OS"). The client application 26 is, for example, a computer program adapted to run on the Palm™ OS. In other embodiments, the handheld device 20 can be, for example, a cellular telephone, digital telephone, satellite telephone, personal digital assistant device, palmtop device, PocketPC™ device, and/or a Windows CE™ compatible device, each running its respective OS, and the client application 26 can be, for example, a computer program adapted to run on the respective OS. The device data storage medium 28 is, for example, a solid-state memory of a type known in the art on which data can be stored in a database, and from which such data can be retrieved from the database, by the client application 26, as denoted by arrow 30.

The server assembly 22 includes a server application 32 running on the server assembly 22 and a server data storage medium 34 accessible by the server application 32.

The server assembly 22 is, for example, at least one server computer of a type known in the art adapted to run a server OS. The server application 32 is, for example, a computer program adapted to run on the server OS. The server data storage medium 34 is, for example, at least one hard drive of a type known in the art on which data can be magnetically stored in a database, and from which such data can be retrieved from the database, by the server application 32, as denoted by arrow 36.

Figure 2:
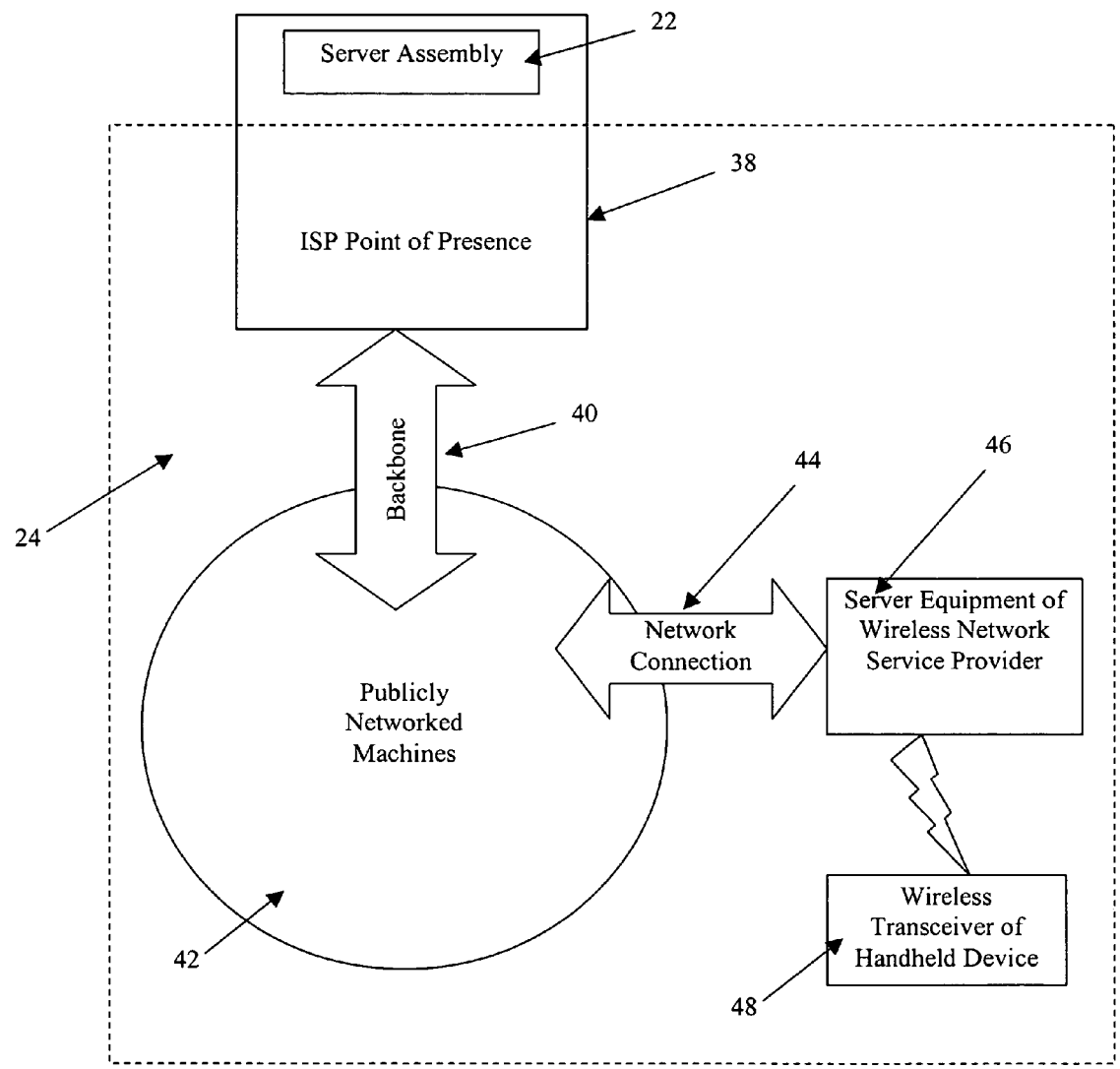
FIG. 2 is a graphic representation of a communication link between a server assembly and a handheld device of the invention.

As shown in FIG. 2, the communication link 24 preferably includes an Internet Service Provider ("ISP") Point of Presence ("POP") 38 to which the server assembly 22 is directly connected and a backbone connection 40 between the ISP POP 38 and publicly networked machines 42. The communication link 24 preferably further includes a network connection 44 between the publicly networked machines 42 and server equipment 46 of a provider of wireless network service. The communication link 24 preferably further includes a wireless transceiver 48 integrated with the handheld device 20 that is recognized by the wireless network service provider. The ISP POP 38, the server assembly 22, the publicly networked machines 42 and the handheld device 20 are preferably able to exchange information according to one or more networking protocols. Preferably, for example, the publicly networked machines 42 are the Internet, and the networking protocols include the Internet Protocol ("IP") as the fundamental networking layer, on top of which the Transmission Control Protocol ("TCP"), the Hypertext Transfer Protocol ("HTTP") and the Mobile Application Link Protocol ("MAL") are successively layered. In this manner, the server assembly 22 and the handheld device 20 are able to exchange data using the communication link 24.

Figure 3:
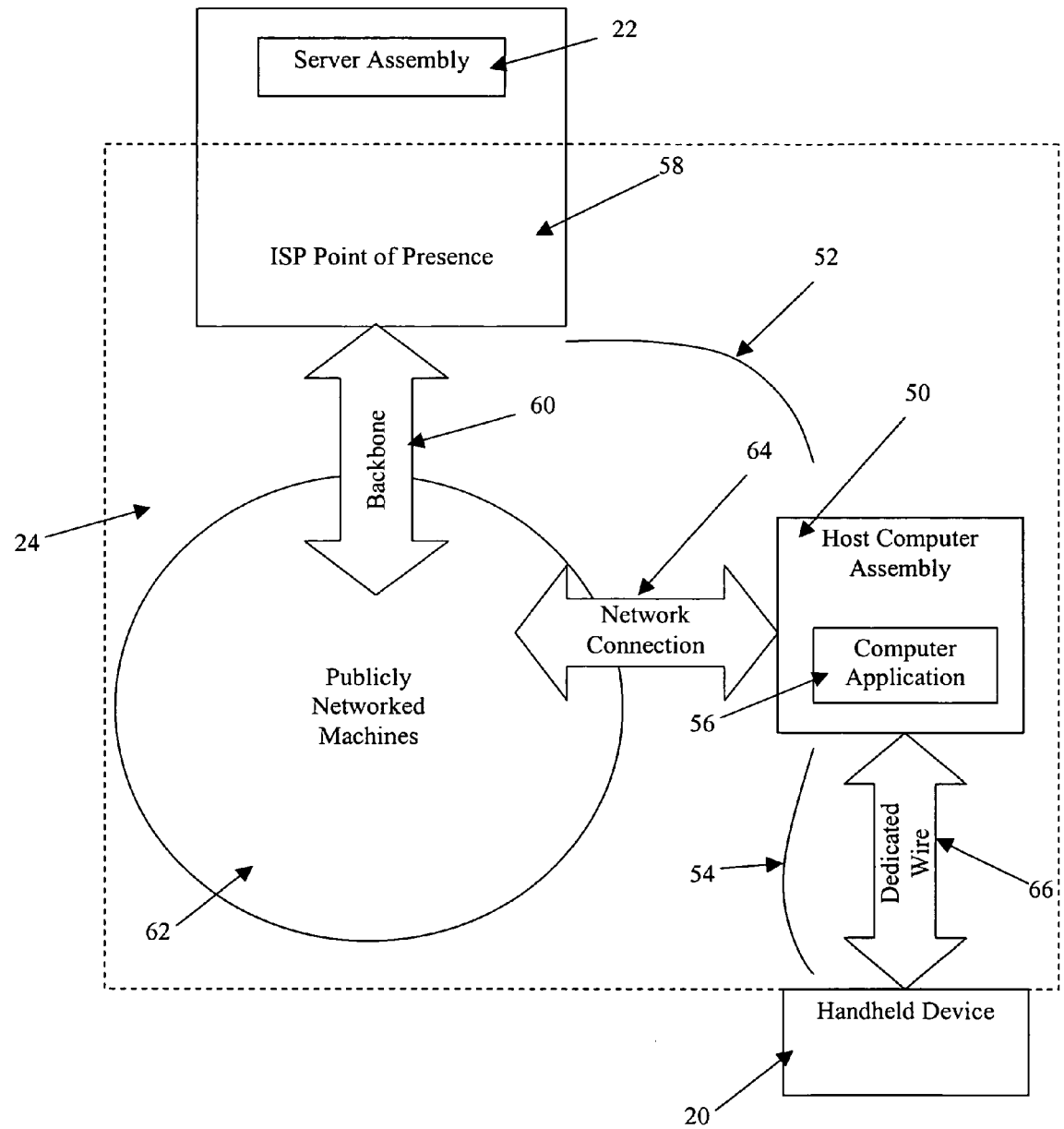
FIG. 3 is a graphic representation of an alternate communication link between a server assembly and a handheld device of the invention.

Alternately, as shown in FIG. 3, the communication link 24 can include, for example, a host computer assembly 50 having (1) a server-computer communication link 52 between the server assembly 22 and the host computer assembly 50, (2) a computer-device communication link 54 between the host computer assembly 50 and the handheld device 20, and (3) a computer application 56. The host computer assembly 50 is, for example, a personal computer of a type known in the art adapted to run a personal computer OS. The computer application 56 is, for example, a computer program adapted to run on the personal computer OS. The server-computer communication link 52 includes, for example, an ISP POP 58 to which the server assembly 22 is directly connected and a backbone connection 60 between the ISP POP 58 and publicly networked machines 62. The server-computer communication link 52 further includes a network connection 64 between the publicly networked machines 62 and the host computer assembly 50. The computer-device communication link 54 includes a dedicated wire connection 66. The computer application 56 enables the host computer assembly 50 to communicate with the server assembly 22 on behalf of the handheld device 20 when the handheld device 20 is connected to the host computer assembly 50 via the dedicated wire connection 66. The ISP POP 58, the server assembly 22, the publicly networked machines 62, the host computer assembly 50, and the handheld device 20 are able to exchange information according to one or more networking protocols. For example, the publicly networked machines 62 are the Internet, and the networking protocols include the IP as the fundamental networking layer, on top of which the TCP, the HTTP and the MAL are successively layered. In this manner, the server assembly 22 and the handheld device 20 are able to exchange data using the communication link 24.

As shown in FIG. 1, the invention further includes activity site information 68 periodically updated in the server data storage medium 34. The activity site information 68 includes, for example, information pertaining to at least one activity site, and preferably to a plurality of activity sites. The activity sites are physical points of interest that are located in a geographic region such as, for example, a city. The activity sites can be, for example, recreational facilities, parks, amusement complexes, gymnasiums, sports complexes, exercise facilities, dance studios, commercial facilities, game parlors, restaurants, bars, nightclubs, cinemas, theatres, retail facilities, stores, residential facilities, houses, apartment buildings, condominium complexes, hotels, government facilities, military facilities, post offices, parking facilities, docking facilities, educational facilities, schools, libraries, conference centers, landmarks, transportation hubs, train stations, subway stations, bus stations, airports, and/or tourist attractions that are located within the limits of the geographic region.

Accordingly, the activity site information 68 includes information pertaining to these activity sites. The activity site information 68 can include, for example, advertisements, recommendations, suggestions or warnings related to the activity site itself, an event taking place at that activity site, and/or prices of goods or information sold at the activity site. The activity site information 68 can also include, for example, times that the activity site is open or times that events are happening at the activity site. The activity site information 68 can also include, for example, the geographic location of the activity site, in a variety of nomenclatures. The activity site information 68 can also include, for example, names and descriptions of the activity site, names and descriptions of events that have taken place, are taking place, or are scheduled to take place at the activity site, and/or ratings and/or reviews of such events. The activity site information 68 can also include, for example, phone numbers, addresses, and/or other contact information that can be used to obtain additional information about the activity site and/or events related to the activity site.

The activity site information 68 is initially stored in the server data storage medium 34 by any means known in the art such as, for example, manual entry into the database and/or transfer from another database. The activity site information 68 is periodically updated in the server data storage medium 34 by any means known in the art as the activity site information 68 becomes outdated or incorrect. The activity site information 68 may become outdated or incorrect when, for example, new activity sites open or are built; existing activity sites close, are torn down, and/or come under new ownership and/or management; the schedule of events related to the activity sites changes; and/or the price of goods or information available at the activity sites changes. The periodic updating ensures that the activity site information 68 remains timely and correct.

The activity site information 68 is correspondingly updated in the device data storage medium 28 using the communication link 24. During the updating process, a portion of the activity site information 70 is deleted, replaced with replacement activity site information, and/or appended with supplemental activity site information, so that the activity site information 70 matches the periodically updated activity site information 68. The updating process is preferably initiated at the request of a user of the handheld device 20. For example, the client application 26 is adapted to obtain such a request from the user and, upon receipt of such a request, to initiate the updating process. The request can be obtained, for example, by the user's activation of a hardware or software button on the handheld device 20 that instructs the client application 26 to begin the updating process. For example, when the handheld device 20 is a Palm™ device, the client application 26 is adapted to instruct the server application 32 to begin the updating process after the user activates the "Hotsync" hardware button on the "Hotsync" cradle, or the "Hotsync" software button in a "Hotsync" application resident on the Palm™ device. The process of updating the activity site information 70 to match the activity site information 68 can be accomplished by any means known in the art.

Also during the updating process, a portion of the client application 26 itself can be deleted, replaced with replacement client application data, or appended with supplemental client application data as needed to remain useful to the user. More specifically, the client application 26 preferably provides a designation means for the user to provide a designation identifier identifying the portion of the client application 26 that the user desires to have updated. For example, if a new version of the client application 26 is available, but an older version of the client application 26 is on the handheld device 20, the user may indicate that he desires to have the old version updated to the new version. Or, for example, if the client application 26 is adapted for use only with activity site information 70 pertaining to activity sites in Washington, D.C., the user may indicate that he desires to have the client application 26 updated to be adapted for use also with activity site information 70 pertaining to activity sites in New York, N.Y. It should be noted that in some embodiments, the designation identifier is determined by the client application 26 automatically without interaction with the user.

Once the designation identifier is obtained by the client application 26, the client application 26 transmits the designation identifier to the server application 32 during the updating process. The server application 32 is adapted to use the designation identifier to select a data structure that includes instructions for applying a modification to the client application 26. The data structure can be, for example, a binary large object ("blob"). During the updating process, the server application 32 transmits the data structure to the client application 26, and the client application 26 uses the data structure to apply the modification.

Figure 4:
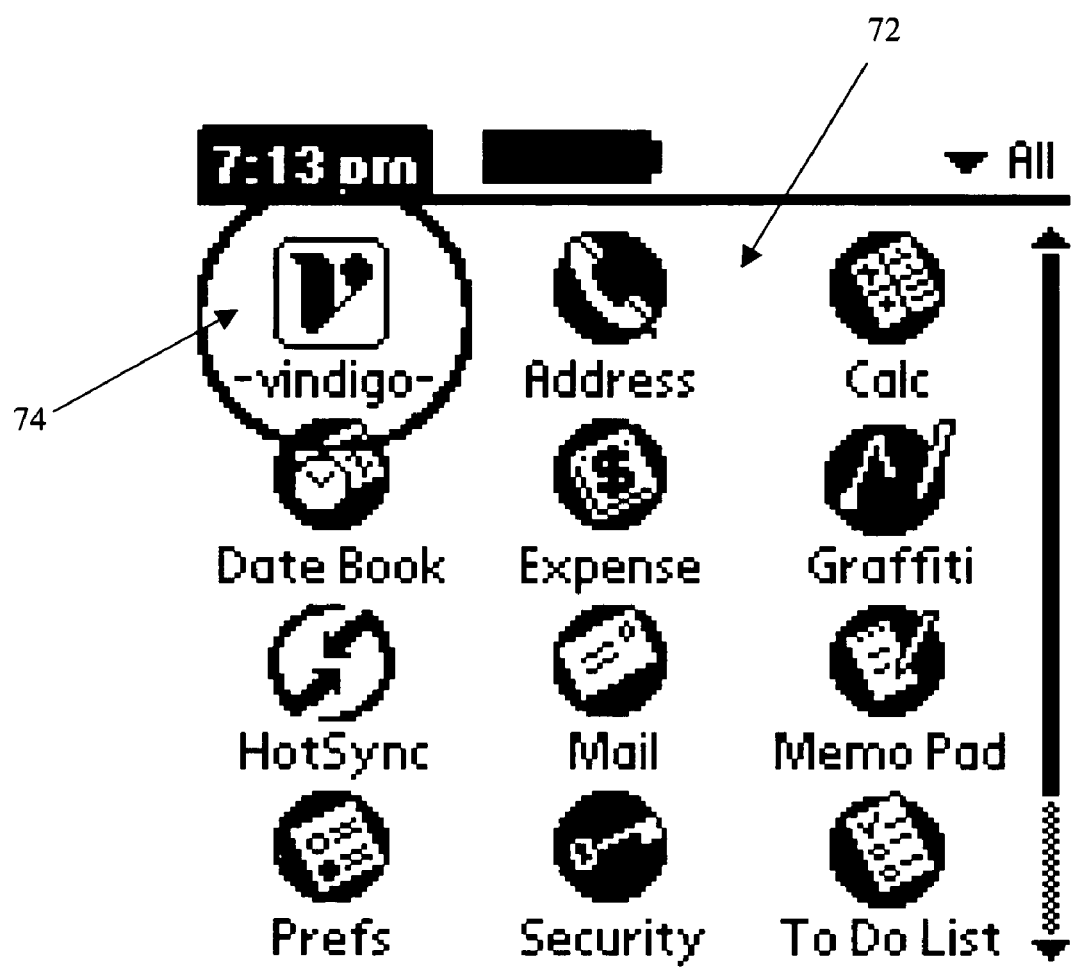
FIG. 4 shows a user interface of the invention showing an application menu.

The client application 26 includes a user interface that is designed to run on the handheld device 20 with, for example, a screen form factor of approximately 160×160 pixels. As shown in FIG. 4, the client application can preferably be accessed by the user from an application menu 72 that displays icons associated with the available applications on the handheld device. The client application can be identified by icon 74, and can be activated by the user's selection of the icon 74.

Once activated by the user, the client application obtains reference location information identifying a reference location. The reference location information can be, for example, a geographic location corresponding to a user location of the user and/or a handheld device location of the handheld device, obtained by the client application through the use of a position locator system in communication with the client application. For example, the client application can receive and process input from a global positioning system ("GPS") receiver that is connected to or integrated into the handheld device and that receives from GPS satellites the approximate geographic position of the user and/or the handheld device as determined by the GPS satellites.

Similarly, the reference location information can be, for example, a temporal location corresponding to a user location of the user and/or a handheld device location of the handheld device, obtained by the client application through the use of a time keeping device in communication with the client application. For example, the client application can receive and process input from a clock application that is connected to or integrated into the handheld device and that indicates the approximate temporal position of the user and/or the handheld device. As another example, if the handheld device has a wireless connection to a remote time server, the client application can receive and process input from the remote time server to determine the approximate temporal location of the user and/or the handheld device.

The reference location information can be, for example, a geographical-temporal location identifier provided by the user. The reference location information may include, for example, a time identifier, a global position identifier, a neighborhood identifier, an intersection identifier, a postal address identifier, a street identifier, a transit station identifier, a landmark identifier, and/or a building identifier. The client application is preferably adapted to provide a provision means for the user to provide the reference location information to the client application. The provision means may include, for example, a menu, a list, a text input line, and/or a graphic. The provision means may include a selection means for the user to select a geographical-temporal location identifier from at least one of a plurality of geographical location identifiers and a plurality of temporal location identifiers.

Figure 5:
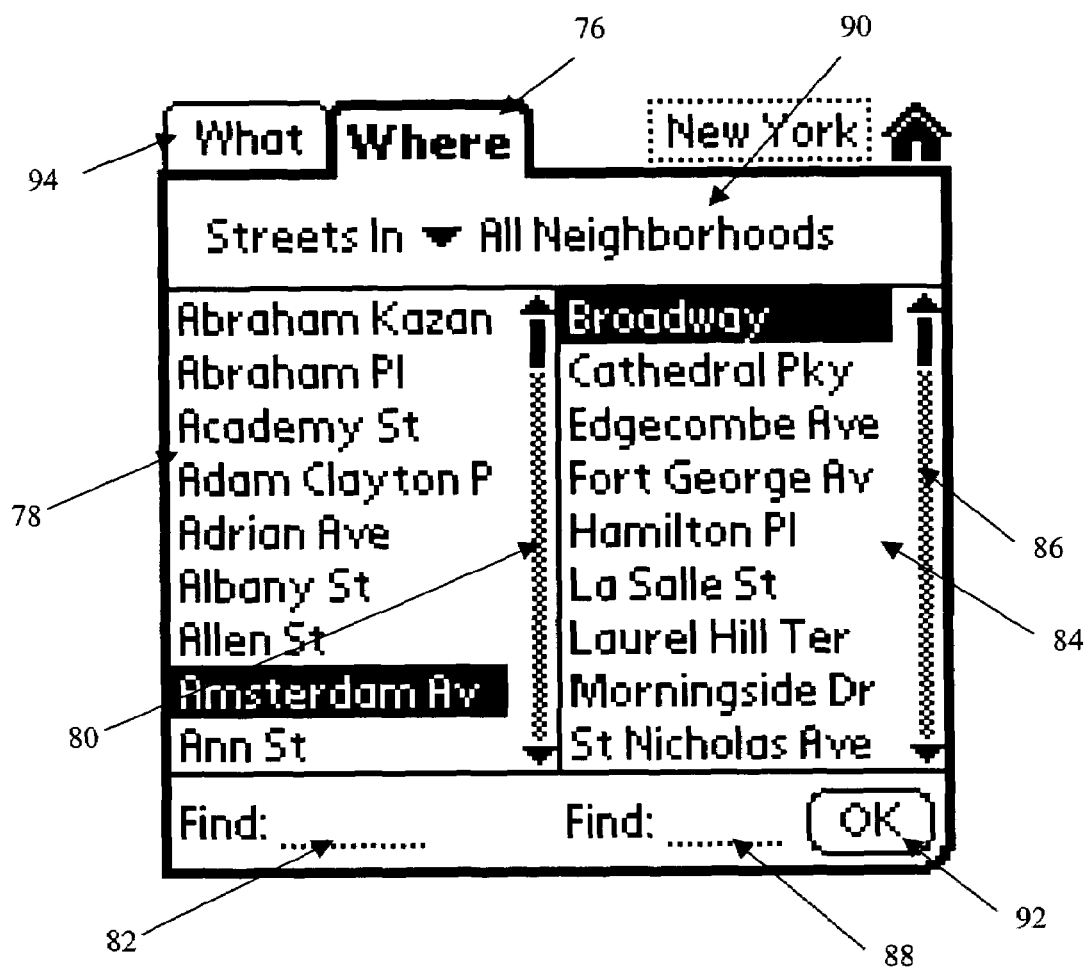
FIG. 5 shows a user interface of the invention showing a means for providing reference location information.

Preferably, as shown in FIG. 5, after selecting a graphic "Where" tab 76, the user is able to indicate to the client application his geographical location as the intersection of two streets, a first street and an intersecting street. The client application preferably provides a first street selection means for the user to select a first street identifier identifying the first street from a plurality of first street identifiers. More specifically, the client application preferably displays an alphabetically sorted list of first street identifiers 78, from which the user selects the desired first street identifier. The user is able to scroll through the list 78 using a scrollbar 80, and/or to enter a prefix substring of the desired first street identifier into a text input line 82, to search for the desired first street identifier. The client application preferably also provides an intersecting street selection means for the user to select an intersecting street identifier identifying the intersecting street from a plurality of intersecting street identifiers. More specifically, the client application preferably displays an alphabetically sorted list of intersecting street identifiers 84, from which the user selects the desired intersecting street identifier. When the user locates and selects the desired first street identifier, the client application limits the list of intersecting street identifiers 84 to only those intersecting street identifiers that identify streets intersecting the first street identified by the selected first street identifier. The user is able to scroll through the list 84 using a scrollbar 86, and/or to enter a prefix substring of the desired intersecting street identifier into a text input line 88, to search for the desired intersecting street identifier.

The client application preferably also provides a neighborhood selection means for the user to select from a plurality of neighborhood identifiers a neighborhood identifier identifying a neighborhood. More specifically, upon the user's activation of a "Neighborhood" graphic 90, the client application preferably displays an alphabetically sorted list of neighborhood identifiers, from which the user selects a neighborhood identifier identifying the neighborhood the user desires to provide as a reference location. The user is able to scroll through the list using a scrollbar, and/or to enter a prefix substring of the desired neighborhood identifier into a text input line, to search for the desired neighborhood identifier. Once the user provides the desired neighborhood identifier, the client application limits the list of first street identifiers 78 to only those streets in the neighborhood identified by the selected neighborhood identifier, selects a default first street identifier from the list of first street identifiers 78, limits the list of intersecting street identifiers 84 to only those streets in the neighborhood identified by the selected neighborhood identifier that intersect the first street identified by the default first street identifier, and selects a default intersecting street identifier from the list of intersecting street identifiers 84. The intersection of the first street identified by the default first street identifier and the intersecting street identified by the default intersecting street identifier is the main intersection in the neighborhood identified by the selected neighborhood identifier, such that the neighborhood is characterized by that intersection. This enables the user to easily locate a familiar location in the neighborhood in which he/she is located.

To confirm the selection of the first street identifier and the intersecting street identifier, the user activates a graphic "OK" button 92. The first street identifier and the intersecting street identifier together identify a reference location to the client application. As shown in FIG. 1, the client application 26 is adapted to access the activity site information 70 from the device data storage medium 28 and determines relationships between the activity site information 70 and the reference location. The relationship is at least one of a geographic relationship and a temporal relationship. For example, the client application 26 preferably retrieves from a database or determines the distance from the reference location to the activity sites associated with the activity site information 70. Or, for example, the client application 26 determines the time between the current time and the starting time of events occurring at the activity sites associated with the activity site information 70.

Once the client application 26 has determined the relationships between the activity site information 70 and the reference location, the client application 26 selects at least a portion of the activity site information 70 based on the relationships and presents the portion to the user with reference to the relationships. Preferably, the client application is adapted to use at least one of the reference location information, the reference location, the geographic relationship, the temporal relationship, demographic information of the user, a preference of the user, a characteristic of the user, a characteristic of the handheld device, data stored in the server data storage medium, and data stored in the device data storage medium to select the portion of the activity site information. The selection of the portion of the activity site information in each embodiment is a dynamic process and is preferably orchestrated according to a series of information requests provided by the user. For example, the client application 26 preferably provides an information request means for the user to provide a requested information identifier identifying that portion of the activity site information that the user desires to have presented to him/her. Once the user has provided the requested information identifier, the client application 26 uses that requested information identifier to select the appropriate portion for presentation. The client application 26 is adapted to use search engines to search the activity site information, or sorting engines to sort the activity site information, to comply with the user's request.

Figure 6:
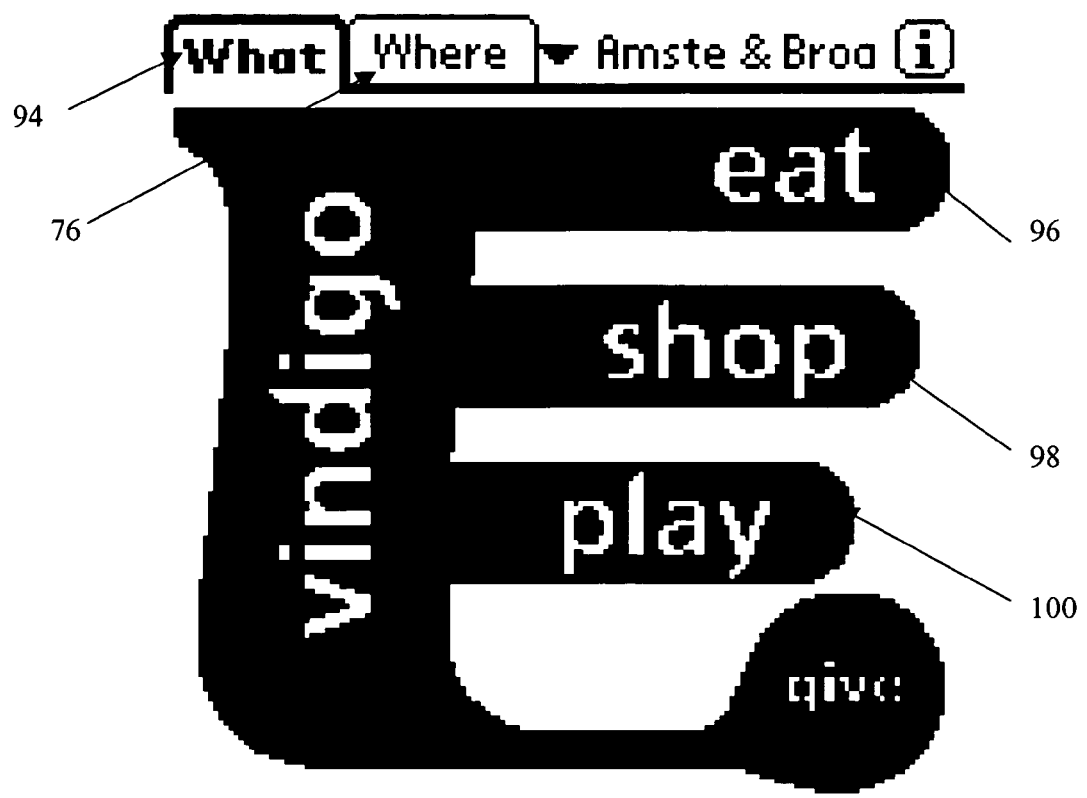
FIG. 6 shows a user interface of the invention showing a means for selecting an activity site information category.

More specifically, as shown in FIG. 6, upon the user's selection of a graphic "What" tab 94, indicating the user's desire to have presented to him/her the activity site information related to the reference location, the client application presents to the user, for example, three buttons 96, 98, 100, each representing a respective activity site information category. The "Eat" button 96 represents activity sites related to dining. The "Shop" button 98 represents activity sites related to shopping. The "Play" button 100 represents activity sites related to recreation. The user indicates which category of activity site information he/she desires to view by selecting the appropriate button.

Figure 7A:
FIGS. 7a and 7b show user interfaces of the invention showing a presentation of the activity site information.
Figure 7B:
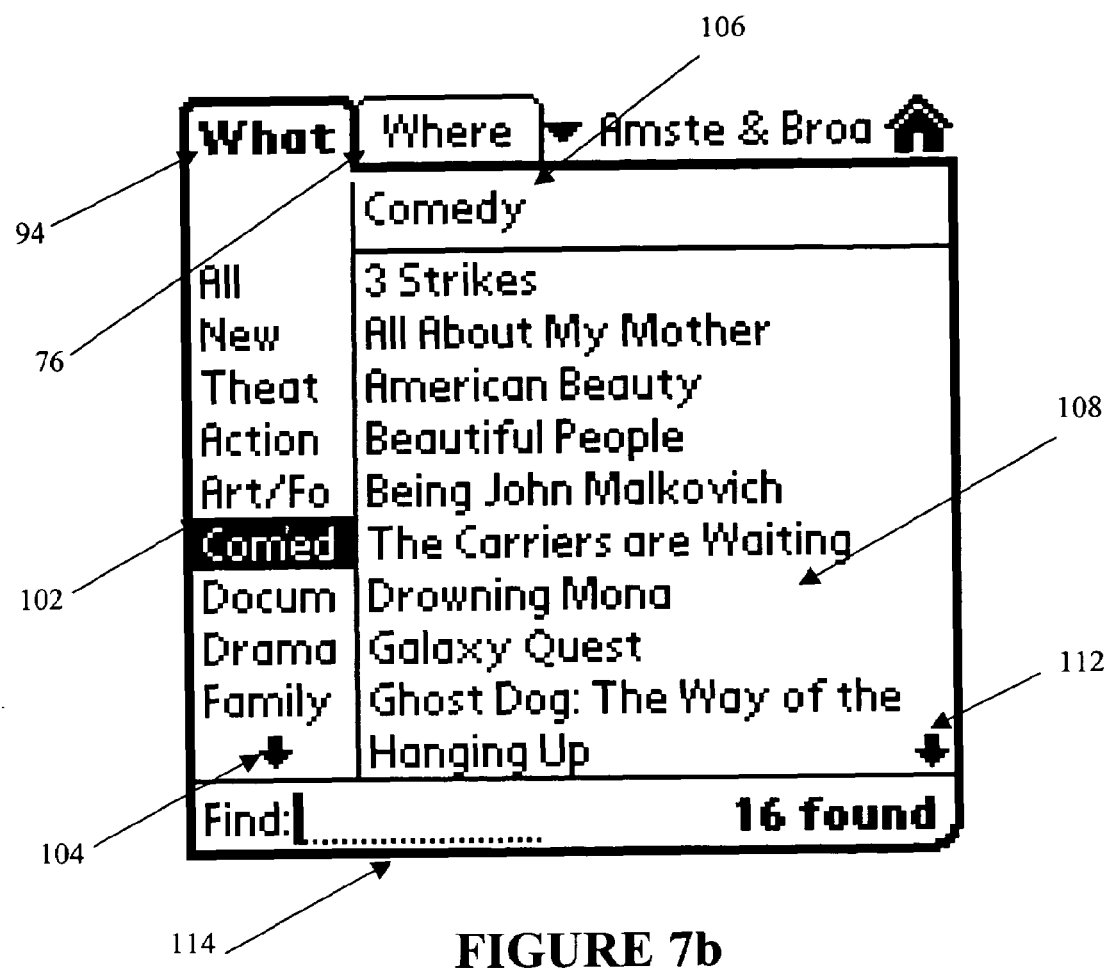

Once the user has selected the desired category, the client application organizes and presents that category's activity site information in dynamically sorted lists. For example, as shown in FIGS. 7a and 7b, the user is preferably able to select an activity site information subcategory from a list of activity site information subcategories 102. For example, as shown in FIG. 7a, restaurant types are displayed in the list 120. The list 120 can preferably be scrolled by activation of an arrow 104 to locate a desired restaurant type. Once the desired restaurant type is located, the user confirms the desired restaurant type by selecting the type name. Or, for example, as shown in FIG. 7b, a list of recreation types are displayed in the list 120. The list 120 can preferably be scrolled by activation of an arrow 104 to locate a desired recreation type. Once the desired recreation type is located, the user confirms the desired recreation type by selecting the type name.

Once an activity site information subcategory is selected, as indicated by a subcategory indicator 106, the names of the activity sites in the selected subcategory are presented in a list of activity sites 108. In FIG. 7b, the list 108 is sorted alphabetically. In FIG. 7a, the list 108 is sorted by default according to increasing geographic distance from the reference location, as indicated by a sort type indicator 110. The user can change the sorting criteria by activating the sort type indicator 110 and selecting an alternate sort type from a dynamically generated list of sort types. Alternate sort types can include, for example, by decreasing geographic distance from the reference location, increasing or decreasing rating, by increasing or decreasing cost, and alphabetically or reverse alphabetically by name. In some embodiments, the list 108 can be constrained to include only those activity sites, for example, within a certain range of rating, cost, or distance. The list 108 can be scrolled using scroll arrows 112, and searched by entering prefix substrings of the names of the activity sites into a text input area 114. As the list 108 is searched in that manner, the display dynamically updates to show the first alphabetically sorted entry corresponding to the prefix substring entered by the user.

The list 108 preferably also shows other activity site information related to the displayed activity sites in summary fashion. For example, the approximate relative cost of the entrees in the restaurants are indicated by cost indicators 116. Other embodiments may include similarly summarized activity site information.

Figure 8:
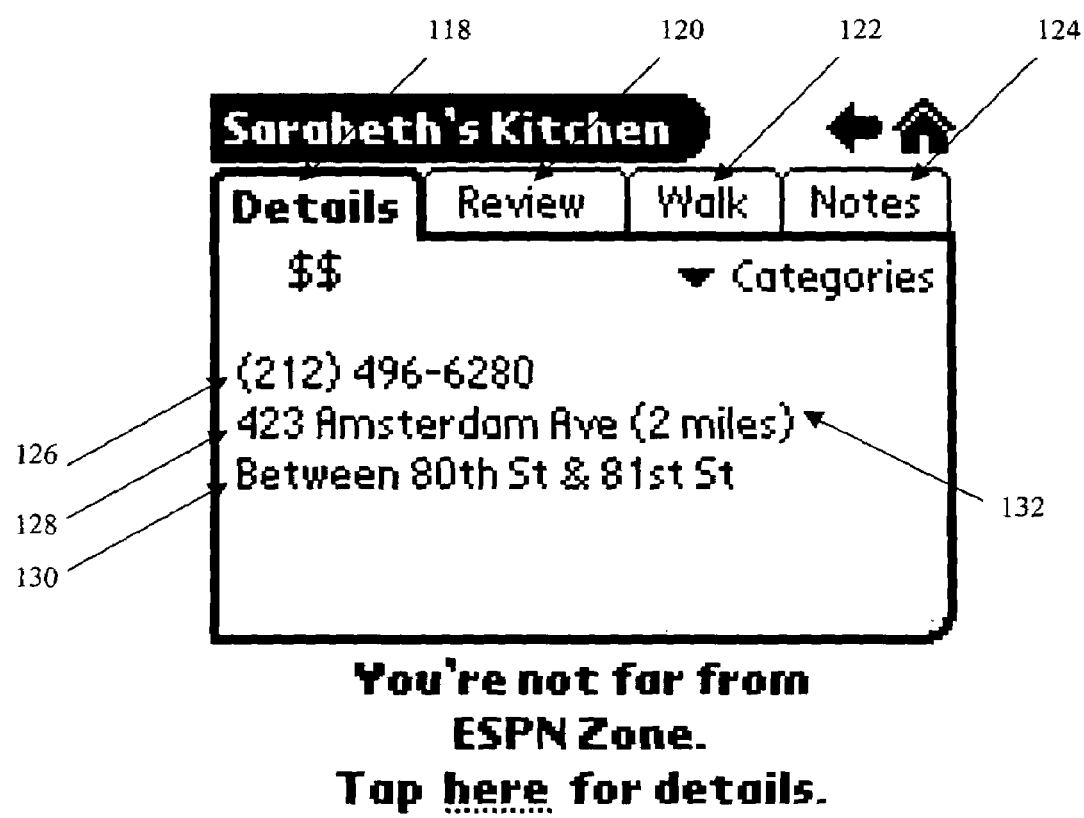
FIG. 8 shows a user interface of the invention showing an additional presentation of the activity site information.
Figure 9:
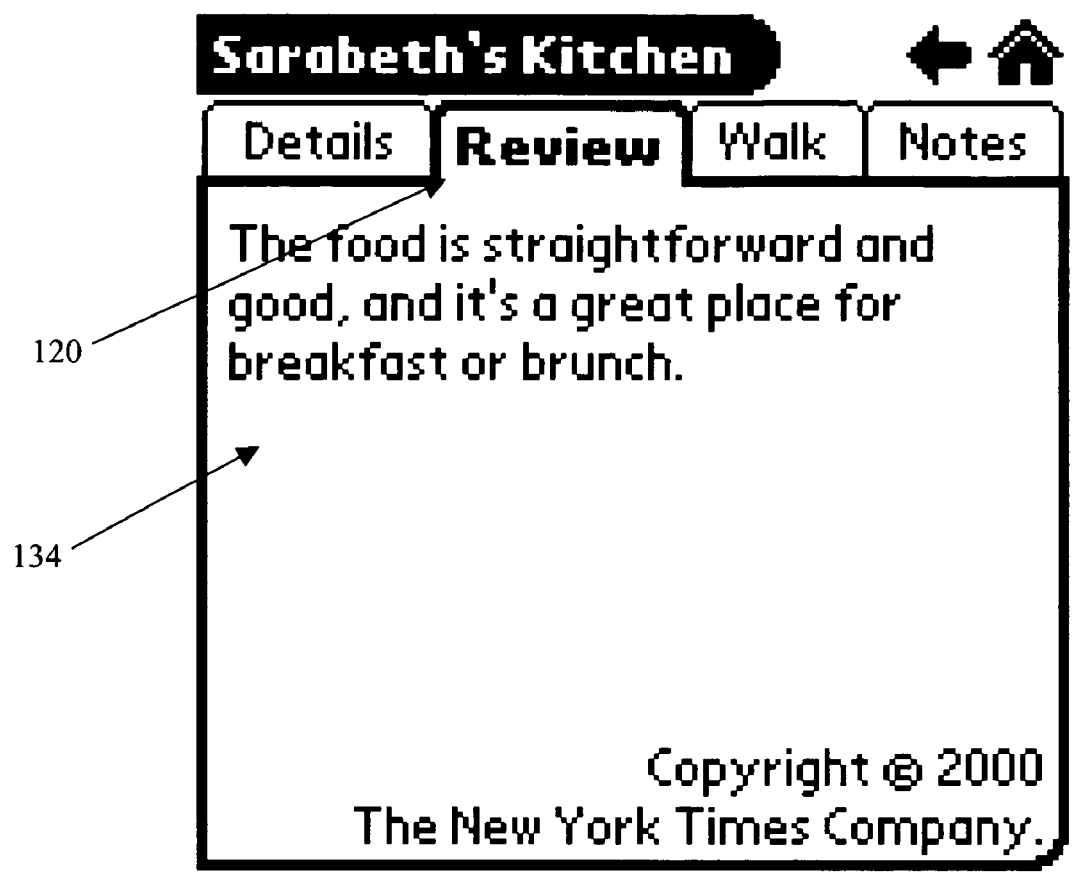
FIG. 9 shows a user interface of the invention showing yet another presentation of the activity site information.

When the user selects one of the names of the activity sites in the list 108, the client application provides detailed activity site information pertaining to the selected activity site. For example, as shown in FIG. 8, the client application presents four tabs 118, 120, 122, 124, two of which when selected present detailed activity site information pertaining to the selected activity site. For example, when the user selects the "Details" tab 118, the client application presents information such as, for example, how costly the meals are at the restaurant, a phone number 126 of the restaurant, an address 128 of the restaurant, an alternate location identifier 130 for the restaurant, and approximately how far away 132 the restaurant is from the reference location. For another example, as shown in FIG. 9, when the user selects the "Review" tab 120, the client application presents a review 134 of the restaurant.

Figure 10:
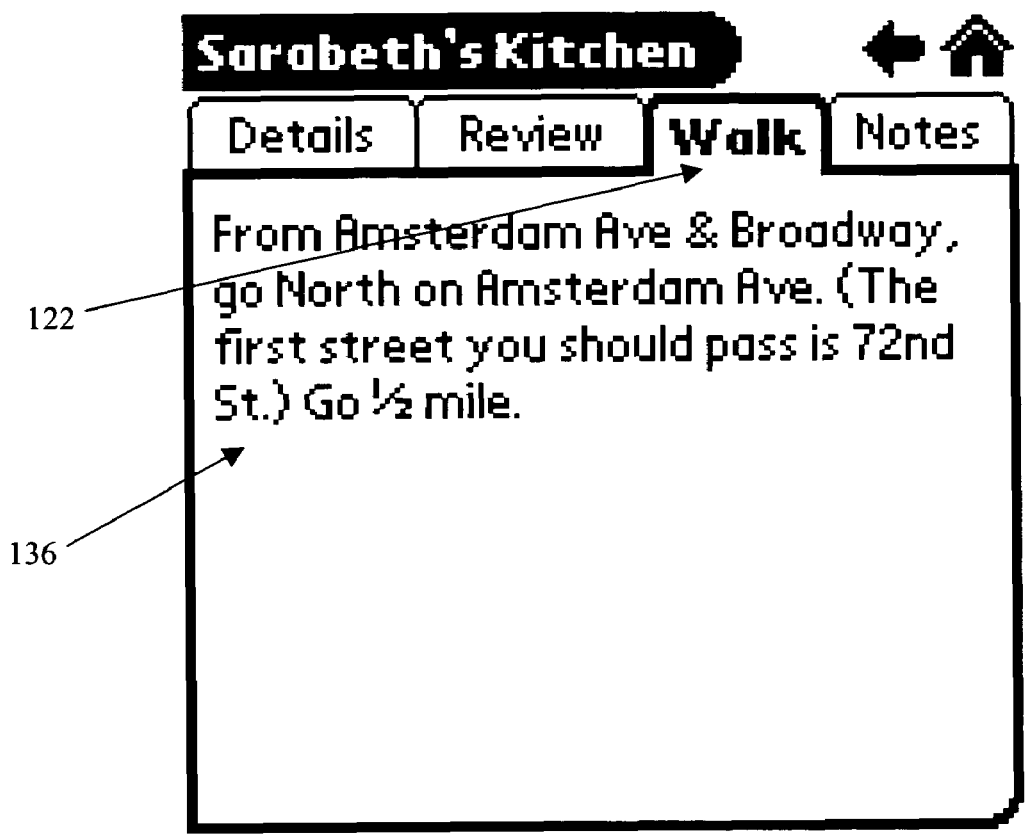
FIG. 10 shows a user interface of the invention showing a presentation of additional activity site information.

The client application is also adapted to generate additional activity site information using the activity site information, the reference location information, the reference location, the relationship between the reference location and the activity site information, demographic information of the user, a preference of the user, a characteristic of the user, a characteristic of the handheld device, data stored in the server data storage medium, data stored in the device data storage medium, or any combination of such items, and present the additional activity site information to the user. The client application is adapted to obtain an additional activity site information request from the user and generate the additional activity site information in response to the additional activity site information request. Preferably, the additional activity site information request includes a request for directions for traveling from the reference location to the location of the selected activity site, and the additional activity site information that the client application generates is the directions. More specifically, as shown in FIG. 10, when the user selects the graphic "Walk" tab 122, the user is requesting the additional activity site information of directions for traveling on foot from the reference location to the location of the selected activity site. In response to this additional activity site information request for directions, the client application determines a route between the reference location and the location of the selected activity site using any method known in the art. The client application then determines and presents the additional activity site information of directions 136 in a textual format for traversing the route. The directions may alternately or additionally be presented in a graphical format and/or an audio format. Preferably, the directions are optimized both for descriptive simplicity and for shortness of route.

Figure 11:
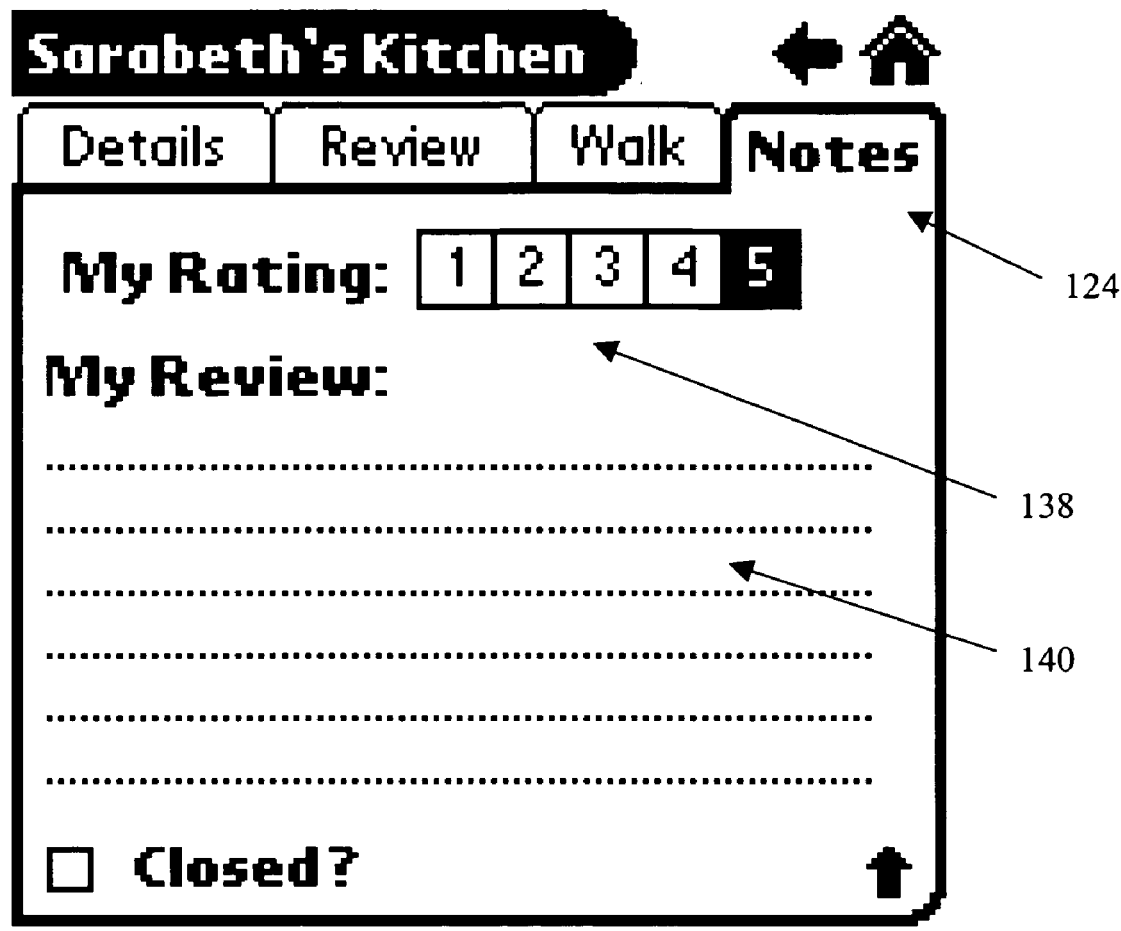
FIG. 11 shows a user interface of the invention showing a means for providing a user contribution.

The client application is also adapted to obtain a user contribution including a user annotation including a statement of the user pertaining to the selected activity site and/or a user addition including information pertaining to a user-added activity site. Preferably, the client application is adapted to provide a user contribution means for the user to provide the user contribution. The user contribution means can include, for example, a menu, a list, a text input line, and/or a graphic. More specifically, as shown in FIG. 11, when the user selects the graphic "Notes" tab 124, the client application presents a graphic rating scale 138 whereby the user can indicate his rating of the activity site and a review text input section 140 whereby the user can enter his review of the activity site. The client application is adapted to store the user contribution in the device data storage medium.

After the user indicates his/her rating and/or enters his/her review, the rating and/or review is stored in the device data storage medium. The client application is also adapted to provide a viewing means for the user to selectively view the user contribution, and notify the user, when the user is not viewing the contribution, that the user contribution exists. For example, when the user revisits the user interface view of FIGS. 7a and/or 7b, such that the user is not viewing the user contribution, the client application is adapted to provide a visual indication (not shown) that a user contribution exists for an activity site, when such a user contribution has been provided by the user. The user is able to view the user contribution at any time by locating and selecting the desired activity site and selecting the graphic "Notes" tab 124.

As shown in FIG. 1, the client application 26 is further adapted to append the user contributions to the activity site information 70 with reference to the relevant activity site and/or the user-added activity site. That is, the user contributions become part of the activity site information and can be viewed as described above when an activity site to which they pertain is selected because they are stored with reference to the relevant activity site and/or the user-added activity site. In addition, they can be accessed by the client application 26 in the manner of other activity site information as described above.

The client application 26 is also adapted to transmit, to the server assembly 22 using the communication link 24, the user contributions. Preferably, this occurs as part of the updating process described above. The server assembly 22 is correspondingly adapted to receive the user contributions and store them in the server data storage medium 34. Preferably, the user contributions are appended to the activity site information 68 with reference to the relevant activity site and/or the user-added activity site. That is, they can be accessed by the server application 32 in the manner of other activity site information as described above.

The server application 32 is adapted to transmit, to a second handheld device using a second communication link between the server assembly 22 and the second handheld device, the user contributions. The second handheld device includes a second client application that is adapted to receive, from the server assembly using the second communication link, the user contributions and store the user contributions in a second device data storage medium of the second handheld device. Preferably, this occurs as part of the updating process of the second handheld device. Preferably, the second communication link is similar to the communication link between the server assembly 22 and the handheld device 20.

Preferably, the server assembly 22 is adapted to receive a plurality of user contributions from a plurality of handheld devices 22, store the user contributions in the server data storage medium 34, analyze the user contributions to obtain at least one analysis result, and transmit the analysis result to the handheld devices 22 and/or other handheld devices 22 for storage in the device data storage mediums 34 of those handheld devices 22. For example, the server assembly 22 is adapted to receive restaurant ratings from the handheld devices 22, analyze the restaurant ratings to determine an average rating, and transmit the average rating to the handheld devices 22 and/or other handheld devices 22.

Figure 12:
FIG. 12 shows a user interface of the invention during the transmission of transfer data to a second handheld device.

Preferably, two or more handheld devices 22 can communicate with one another through the use of communication links therebetween. This can be possible, for example, through the use of an infrared port on the handheld devices 22 or a short range radio signal link between the handheld devices 22. As shown in FIG. 12, the client application is preferably further adapted to transmit transfer data to a second handheld device using such a second communication link between the handheld device and a second handheld device. The transfer data can include, for example, a portion of a user annotation, a portion of a user addition, a portion of the activity site information, and/or a portion of the client application. FIG. 12 shows the user interface when the client application is being transmitted ("beamed" using an infrared port of the handheld device) to the second handheld device. The second handheld device is preferably adapted to receive the transfer data and store it in a second device data storage medium of the second handheld device.

In the case where the transfer data is at least a portion of the client application and/or a portion of the activity site information, the transfer data preferably cannot be updated prior to the user of the second handheld device registering his/her use of the client application. This enables an administrator of the client application to obtain and make business or marketing decisions based on accurate user registration data.

As shown in FIG. 1, the client application 26 is further adapted to maintain on the handheld device 20 at least one historical record pertaining to at least one of (1) a request of the client application 26 by the user, (2) a presentation of information by the client application 26 to the user, (3) an interaction between the user and at least one of the client application 26 and the handheld device 20, (4) an interaction between the client application 26 and at least one of the handheld device 20 and the server assembly 22, and (5) an interaction between the handheld device 20 and the server assembly 22. The historical record includes, for example, at least one of a date stamp, a time stamp, a demographic tuple identifier, a session identifier, an event type identifier, a context integer identifier and a context string identifier. The demographic tuple identifier, for example, identifies the demographic characteristics of the user such as, for example, age, gender, and/or income range. The context integer identifier and the context string identifier, for example, identify extra information regarding an event. For example, when the event type is a location change event, the context integer identifier and/or the context string identifier identifies the location changed to. For another example, when the event type is a business lookup event, the context integer identifier and/or the context string identifier identifies the business looked up.

The client application 26 is further adapted to use at least one of the historical record, the reference location information, the reference location, the geographic relationship, the temporal relationship, demographic information of the user, a preference of the user, a characteristic of the user, a characteristic of the handheld device 20, data stored in the server data storage medium 34, and data stored in the device data storage medium 28 to present to the user at least one of an advertisement, a recommendation, a suggestion, and a warning.

The client application 26 is further adapted to transmit, to the server assembly 22 using the communication link 24, at least a portion of the historical record. The server application 20 is further adapted to receive, from the handheld device 20 using the communication link 24, the portion of the historical record, and store the portion of the historical record in the server data storage medium 34.

Figure 13:
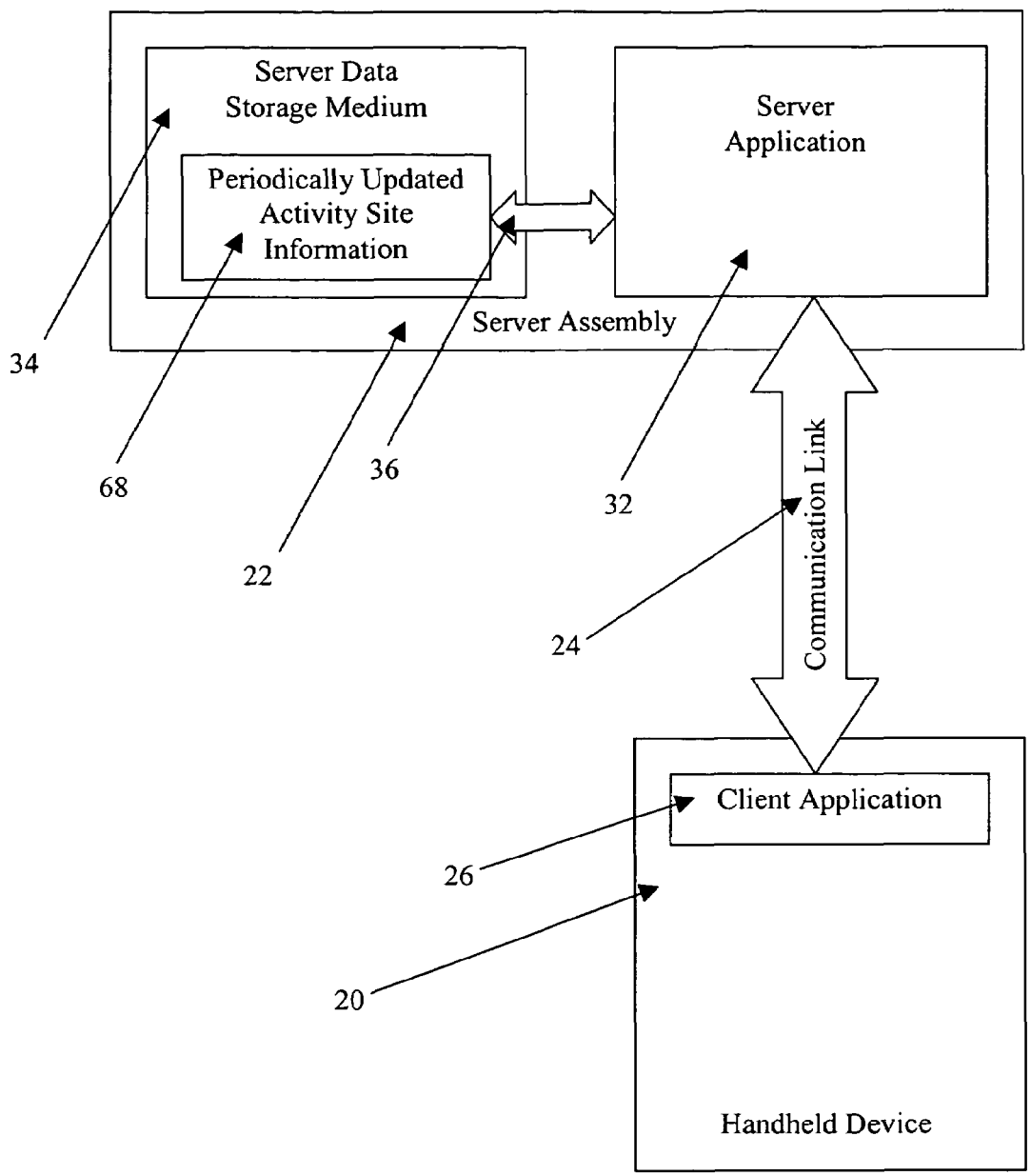
FIG. 13 is a graphic representation of a second embodiment of the invention.

A first embodiment of the invention has been described wherein the activity site information is periodically updated in the server data storage medium 34 and correspondingly updated in the device data storage medium 28 during the update process. The client application 26 of such an embodiment, as described, obtains reference location information identifying a reference location, accesses the activity site information 70 from the device data storage medium 28, determines relationships between the activity site information 70 and the reference location, and selects the portion of the activity site information 70 to be presented to the user. In a second embodiment, illustrated in FIG. 13, the server application 32 performs these processing functions. The activity site information 68 is not updated in a device data storage medium of the handheld device 20. The server application 32 accesses the activity site information 68 from the server data storage medium 34.

In this second embodiment, the client application 62 functions merely as the liaison between the server application 32 and the user of the handheld device 20. The client application 26 is in communication with the server application 32 through the communication link 24, which preferably is a wireless communication link of the type shown in FIG. 2.

The interaction between the server application 32 and the client application 26 during the determination of the reference location information in this second embodiment is exemplary of the interaction with regard to other features and functions of the invention in this second embodiment. The server application 32 receives the reference location information from the client application 26. For example, during the user's identification of the reference location as the intersection of two streets, the server application 32 selects and transmits the lists of first street identifiers and intersecting street identifiers to the client application 26 for presentation to the user as shown in FIG. 5. The client application 26 also obtains the user's navigational and searching instructions, such as, for example, when the user activates the scrollbars 96, 102 or uses the text input lines 98, 104. The client application 26 transmits these instructions to the server application 32 using the communication link 24. The server application 32 in turn determines how the presented activity site information should be updated based on the instructions, and sends new lists of first street identifiers and intersecting street identifiers to the client application 26. When the user navigates to and selects the first street identifier and the intersecting street identifier, the client application 26 transmits them to the server application. The server application 32 identifies a reference location using the identifiers, accesses the activity site information 68 from the server data storage medium 34, determines relationships between the activity site information 68 and the reference location, and selects the portion of the activity site information 68 to be presented to the user. The server application 32 then transmits the selected portion to the client application 26 and the client application 26 presents the portion to the user on the handheld device 20.

It should be understood that the description of the various features and functions of the invention described above with regard to the first embodiment apply to this second embodiment, with the exception that for the primary features and functions, the server application performs the information processing role, and the client application 26 performs the data gathering and presentation roles on behalf of the server application 32. In this manner, the user's experience using the second embodiment is virtually identical to the user's experience using the first embodiment.

Those skilled in the art will recognize that the system and method of the invention have many applications, and that the invention is not limited to the representative embodiments disclosed herein. The scope of the invention is only limited by that of the claims appended hereto.

What is claimed is:

1. A system for providing to a user of a handheld device at least one of location-based information and time-based information, comprising:
   a) a server assembly comprising a server application and a server data storage medium;
   b) activity site information periodically updated in said server data storage medium and pertaining to at least one activity site;
   c) said activity site information being correspondingly updated in a device data storage medium of said handheld device using a communication link between said handheld device and said server assembly; and
   d) a client application on said handheld device adapted to:
      i) obtain reference location information identifying a reference location;
      ii) access said activity site information from said device data storage medium;
      iii) determine a relationship between said activity site information and said reference location, said relationship being at least one of a geographic relationship and a temporal relationship,
      iv) select at least a portion of said activity site information based on said relationship;
      v) present said portion of said activity site information to said user with reference to said relationship; and
      vi) obtain a user contribution comprising at least one of:
         a) a user annotation comprising a statement of said user pertaining to said activity site; and
         b) a user addition comprising information pertaining to a user-added activity site.

2. The system of claim 1, wherein:
   a) said communication link between said handheld device and said server assembly is a server-device communication link comprising a host computer assembly having:
      i) a server-computer communication link to said server assembly,
      ii) a computer-device communication link to said handheld device, and
      iii) a computer application;
   a) said server application is adapted to transmit said activity site information from said server data storage medium to said host computer using said server-computer communication link;
   b) said computer application is adapted to transmit said activity site information to said handheld device using said computer-device communication link; and
   c) said client application is adapted to store said activity site information in said device data storage medium.

3. The system of claim 1, wherein said reference location information comprises at least one of:
   a) a geographical-temporal location identifier provided by said user;
   b) a geographical location of at least one of said user and said handheld device; and
   c) a temporal location of at least one of said user and said handheld device.

4. The system of claim 1, wherein said client application is further adapted to:
   a) generate additional activity site information using at least one of said activity site information, said reference location information, said reference location, said geographic relationship, said temporal relationship, demographic information of said user, a preference of said user, a characteristic of said user, a characteristic of said handheld device, data stored in said server data storage medium, and data stored in said device data storage medium; and b) present said additional activity site information to said user.

5. The system of claim 4, wherein said client application is further adapted to:
a) obtain an additional activity site information request from said user; and
b) generate said additional activity site information in response to said additional activity site information request.

6. The system of claim 5, wherein:
a) said activity site information comprises an activity site location;
b) said additional activity site information comprises directions for traveling between said reference location and said activity site location; and
c) said additional activity site information request comprises a request for said directions.

7. The system of claim 4, wherein:
a) said activity site information comprises an activity site location; and
b) said additional activity site information comprises directions for traveling between said reference location and said activity site location.

8. The system of claim 7, wherein said client application is further adapted to determine a route between said reference location and said activity site location.

9. The system of claim 7, wherein said client application is adapted to present said directions in at least one of a textual format, a graphical format, and an audio format.

10. The system of claim 1, wherein said client application is further adapted to provide a provision means for said user to provide said reference location information to said client application.

11. The system of claim 10, wherein said provision means comprises at least one of a menu, a list, a text input line, and a graphic.

12. The system of claim 10, wherein said client application is adapted to provide a selection means for said user to select a geographical-temporal location identifier from at least one of a plurality of geographical location identifiers and a plurality of temporal location identifiers.

13. The system of claim 10, wherein said reference location information comprises at least one of a time identifier, a global position identifier, a neighborhood identifier, an intersection identifier, a postal address identifier, a street identifier, a transit station identifier, a landmark identifier, and a building identifier.

14. The system of claim 13, wherein said client application is adapted to:
a) provide a first street selection means for said user to select a first street identifier identifying a first street from a plurality of first street identifiers; and
b) provide an intersecting street selection means for said user to select an intersecting street identifier from a plurality of intersecting street identifiers each identifying a street intersecting said first street.

15. The system of claim 14, wherein:
a) said client is adapted to provide a neighborhood selection means for said user to select a neighborhood identifier identifying a neighborhood from a plurality of neighborhood identifiers; and
b) none of said plurality of first street identifiers identifies a street completely outside of said neighborhood.

16. The system of claim 15, wherein said client is adapted to select a default first street identifier from said plurality of first street identifiers and a default intersecting street identifier from said plurality of intersecting street identifiers.

17. The system of claim 16, wherein said neighborhood is characterized by an intersection of a street identified by said default first street identifier and a street identified by said default intersecting street identifier.

18. The system of claim 1, wherein said client application is adapted to determine at least one of a handheld device location of said handheld device and a user location of said user.

19. The system of claim 18, wherein said client application is adapted to use at least one of a component of a global positioning system and a component of a time-keeping system.

20. The system of claim 1, wherein said client application is adapted to provide a user contribution means for said user to provide said user contribution to said client application.

21. The system of claim 20, wherein said user contribution means comprises at least one of a menu, a list, a text input line, and a graphic.

22. The system of claim 1, wherein said client application is further adapted to store said user contribution in said device data storage medium.

23. The system of claim 22, wherein said client application is further adapted to append said user contribution to said activity site information with reference to at least one of said activity site and said user-added activity site.

24. The system of claim 22, wherein said client application is further adapted to provide a viewing means for said user to selectively view said user contribution.

25. The system of claim 24, wherein said client application is further adapted to notify said user, when said user is not viewing said user contribution, that said user contribution exists.

26. The system of claim 22, wherein said client application is further adapted to transmit said user contribution to said server assembly using at least one of said communication link between said handheld device and said server assembly and another communication link between said handheld device and said server assembly.

27. The system of claim 26, wherein said server application is further adapted to:
a) receive a plurality of user contributions from a plurality of handheld devices;
b) store said plurality of user contributions in said server data storage medium;
c) analyze said user contributions to obtain at least one analysis result; and
d) transmit said analysis result to at least one of:
  i) at least one of said plurality of handheld devices, using at least one of said communication link between said handheld device and said server assembly, another communication link between said handheld device and said server assembly, and a communication link between said server assembly and said at least one of said plurality of handheld devices; and
  ii) at least one other handheld device not included in said plurality of handheld devices, using a communication link between said server assembly and said at least one other handheld device.

28. The system of claim 26, wherein said server application is further adapted to store said user contribution in said server data storage medium.

29. The system of claim 28, wherein said server application is further adapted to append said user contribution to said activity site information with reference to at least one of said activity site and said user-added activity site.

30. The system of claim 28, wherein:
a) said server application is further adapted to transmit, to a second handheld device using a communication link between said server assembly and said second handheld device, said user contribution; and
b) further comprising on said second handheld device a second client application adapted to store said user contribution in a second device data storage medium of said second handheld device.

31. The system of claim 1, wherein said client application is further adapted to update on said handheld device at least one of:
a) at least a portion of said activity site information; and
b) at least a portion of said client application.

32. The system of claim 31, wherein said client application is adapted to accomplish at least one of:
a) deleting said portion of said client application;
b) replacing said portion of said client application with replacement client application data;
c) appending supplemental client application data to said portion of said client application;
d) deleting said portion of said activity site information to be updated;
e) replacing said portion of said activity site information to be updated with replacement activity site information; and
f) appending supplemental activity site information to said portion of said activity site information to be updated.

33. The system of claim 31, wherein said client application is further adapted to:
a) receive a data structure from said server assembly using at least one of said communication link between said handheld device and said server assembly and another communication link between said handheld device and said server assembly, said data structure comprising instructions for applying a modification to said client application; and
b) use said data structure to apply said modification to said client application.

34. The system of claim 33, wherein:
a) said server application is further adapted to:
i) receive a designation identifier from said handheld device using at least one of said communication link between said handheld device and said server assembly and another communication link between said handheld device and said server assembly, said designation identifier identifying said portion of said client application to be updated, and
ii) use said designation identifier to select said data structure; and
b) said client application is further adapted to:
i) obtain said designation identifier from said user by providing a designation means for said user to provide said designation identifier to said client application, and
ii) transmit said designation identifier to said server assembly using at least one of said communication link between said handheld device and said server assembly and another communication link between said handheld device and said server assembly.

35. The system of claim 1, wherein said client application is further adapted to:
a) obtain a requested information identifier by providing an information request means for said user to provide a requested information identifier identifying said portion; and
b) use said requested information identifier to select said portion.

36. The system of claim 35, wherein said client application is adapted to use at least one of:
a) a search engine adapted to search said activity site information, and
b) a sorting engine adapted to sort said activity site information.

37. The system of claim 1, wherein:
a) said client application is further adapted to transmit, to a second handheld device using a communication link between said handheld device and said second handheld device, transfer data comprising at least one of:
i) at least a portion of a user annotation comprising a statement of said user pertaining to said activity site,
ii) at least a portion of a user addition comprising information pertaining to a user-added activity site,
iii) at least a portion of said activity site information, and
iv) at least a portion of said client application;
b) said second handheld device being adapted to store said transfer data in a second device data storage medium of said second handheld device.

38. The system of claim 37, wherein said communication link between said handheld device and said second handheld device comprises at least one of an infrared port and a short range radio signal link.

39. The system of claim 37, wherein said transfer data cannot be updated on said second handheld device prior to a registration of a second user of said second handheld device.

40. The system of claim 1, wherein said client application is adapted to use at least one of said reference location information, said reference location, said geographic relationship, said temporal relationship, demographic information of said user, a preference of said user, a characteristic of said user, a characteristic of said handheld device, data stored in said server data storage medium, and data stored in said device data storage medium to select said portion of said activity site information.

41. The system of claim 1, wherein said client application is further adapted to maintain on said handheld device at least one historical record pertaining to at least one of:
a) a request of said client application by said user,
b) a presentation of information by said client application to said user,
c) an interaction between said user and at least one of said client application and said handheld device,
d) an interaction between said client application and at least one of said handheld device and said server assembly, and
e) an interaction between said handheld device and said server assembly.

42. The system of claim 41, wherein said historical record comprises at least one of a date stamp, a time stamp, a demographic tuple identifier, a session identifier, an event type identifier, a context integer identifier and a context string identifier.

43. The system of claim 41, wherein said client application is further adapted to use at least one of said historical record, said reference location information, said reference location, said geographic relationship, said temporal relationship, demographic information of said user, a preference of said user, a characteristic of said user, a characteristic of said handheld device, data stored in said server data storage medium, and data stored in said device data storage medium to present to said user at least one of an advertisement, a recommendation, a suggestion, and a warning.

44. The system of claim 41, wherein:
a) said client application is further adapted to transmit at least a portion of said historical record to said server assembly using at least one of said communication link between said handheld device and said server assembly and another communication link between said handheld device and said server assembly; and b) said server application is further adapted to store said portion of said historical record in said server data storage medium.

45. A system for providing to a user of a handheld device at least one of location-based information and time-based information, comprising:
   a) a server assembly comprising a server data storage medium;
   b) activity site information periodically updated in said server data storage medium and pertaining to at least one activity site;
   c) a server application on said server assembly adapted to:
      i) receive reference location from said handheld device using a communication link between said server assembly and said handheld device, said reference location information identifying a reference location,
      ii) access said activity site information from said server data storage medium,
      iii) determine a relationship between said activity site information and said reference location, said relationship being at least one of a geographic relationship and a temporal relationship,
      iv) select at least a portion of said activity site information based on said relationship, and
      v) transmit said portion to said handheld device using at least one of said communication link between said handheld device and said server assembly and another communication link between said handheld device and said server assembly; and
   d) a client application on said handheld device adapted to:
      i) obtain said reference location information,
      ii) transmit said reference location information to said server assembly using at least one of said communication link between said handheld device and said server assembly and another communication link between said handheld device and said server assembly,
      iii) receive said portion of said activity site information from said server assembly using at least one of said communication link between said handheld device and said server assembly and another communication link between said handheld device and said server assembly, and
      iv) present said portion of said activity site information to said user with reference to said relationship;
   e) wherein client application is further adapted to obtain a user contribution comprising at least one of:
      i) a user annotation comprising a statement of said user pertaining to said activity site; and
      ii) a user addition comprising information pertaining to a user-added activity site.

46. The system of claim 45, wherein said reference location information comprises at least one of:
   a) a geographical-temporal location identifier provided by said user;
   b) a geographical location of at least one of said user and said handheld device; and
   c) a temporal location of at least one of said user and said handheld device.

47. The system of claim 46, wherein said reference location information comprises at least one of a time identifier, a global position identifier, a neighborhood identifier, an intersection identifier, a postal address identifier, a street identifier, a transit station identifier, a landmark identifier, and a building identifier.

48. The system of claim 45, wherein said client application is adapted to provide a user contribution means for said user to provide said user contribution to said client application.

49. The system of claim 48, wherein said user contribution means comprises at least one of a menu, a list, a text input line, and a graphic.

50. The system of claim 45, wherein said client application is further adapted to transmit said user contribution to said server assembly using at least one of said communication link between said handheld device and said server assembly and another communication link between said handheld device and said server assembly.

51. The system of claim 50, wherein said server application is further adapted to:
   a) receive a plurality of user contributions from a plurality of handheld devices;
   b) store said plurality of user contributions in said server data storage medium;
   c) analyze said user contributions to obtain at least one analysis result; and
   d) transmit said analysis result to at least one of:
      i) at least one of said plurality of handheld devices, using at least one of said communication link between said handheld device and said server assembly, another communication link between said handheld device and said server assembly, and a communication link between said server assembly and said at least one of said plurality of handheld devices; and
      ii) at least one other handheld device not included in said plurality of handheld devices, using a communication link between said server assembly and said at least one other handheld device.

52. The system of claim 50, wherein said server application is further adapted to store said user contribution in said server data storage medium.

53. The system of claim 52, wherein said server application is further adapted to append said user contribution to said activity site information with reference to at least one of said activity site and said user-added activity site.

54. The system of claim 52, wherein:
   a) said server application is further adapted to transmit said user contribution to a second handheld device using a communication link between said server assembly and said second handheld device; and
   b) further comprising on said second handheld device a second client application adapted to receive said user contribution from said server assembly using said communication link between said server assembly and said second handheld device.

55. The system of claim 52, wherein:
   a) said server application is further adapted to transmit said user contribution to said handheld device using at least one of said communication link between said handheld device and said server assembly and another communication link between said handheld device and said server assembly; and
   b) said client application is further adapted to provide a viewing means for said user to view said user contribution.

56. The system of claim 55, wherein said client application is further adapted to notify said user, when said user is not viewing said user contribution, that said user contribution exists.

* * * * *